United States Patent
Iyer et al.

(10) Patent No.: US 11,868,815 B2
(45) Date of Patent: Jan. 9, 2024

(54) MANAGING COMPUTE RESOURCES AND RUNTIME OBJECT LOAD STATUS IN A PLATFORM FRAMEWORK

(71) Applicant: Dell Products, L.P., Round Rock, TX (US)

(72) Inventors: Vivek Viswanathan Iyer, Austin, TX (US); Daniel L. Hamlin, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 361 days.

(21) Appl. No.: 17/355,246

(22) Filed: Jun. 23, 2021

(65) Prior Publication Data
US 2022/0413938 A1 Dec. 29, 2022

(51) Int. Cl.
*G06F 9/50* (2006.01)
*G06F 11/30* (2006.01)
*G06F 9/54* (2006.01)

(52) U.S. Cl.
CPC ............ *G06F 9/5083* (2013.01); *G06F 9/505* (2013.01); *G06F 9/5038* (2013.01); *G06F 9/542* (2013.01); *G06F 11/3058* (2013.01)

(58) Field of Classification Search
CPC ..................................................... G06F 9/5083
See application file for complete search history.

(56) References Cited

U.S. PATENT DOCUMENTS

| | | | |
|---|---|---|---|
| 2017/0270247 A1* | 9/2017 | Tang | G06F 9/542 |
| 2020/0351225 A1* | 11/2020 | Lenchner | G06Q 50/01 |

* cited by examiner

*Primary Examiner* — Charlie Sun
(74) *Attorney, Agent, or Firm* — Fogarty LLP (57) ABSTRACT

Embodiments of systems and methods for managing compute resources and runtime object load status in a platform framework are described. In some embodiments, an Information Handling System (IHS) may include a processor and a memory coupled to the processor, the memory having program instructions stored thereon that, upon execution, cause the IHS to: receive, at a platform framework via an Application Programming Interface (API), an arbitration policy; notify an application, by the platform framework via the API, of a state change with respect to the arbitration policy based upon a change in context; receive, at the platform framework from the application via the API, an identification of at least one compute resource to execute a workload associated with the arbitration policy; and offload the workload to the compute resource.

20 Claims, 6 Drawing Sheets

MANAGING COMPUTE RESOURCES AND RUNTIME OBJECT LOAD STATUS IN A PLATFORM FRAMEWORK

FIELD

The present disclosure relates generally to Information Handling Systems (IHSs), and more particularly, to systems and methods for managing compute resources and runtime object load status in a platform framework.

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Embodiments of systems and methods for managing compute resources and runtime object load status in a platform framework are described. In an illustrative, non-limiting embodiment, an Information Handling System (IHS) may include a processor and a memory coupled to the processor, the memory having program instructions stored thereon that, upon execution, cause the IHS to: receive, at a platform framework via an Application Programming Interface (API), an arbitration policy; notify an application, by the platform framework via the API, of a state change with respect to the arbitration policy based upon a change in context; receive, at the platform framework from the application via the API, an identification of at least one compute resource to execute a workload associated with the arbitration policy; and offload the workload to the compute resource.

The application may be registered with the platform framework to be notified of the state change. The state change may include a change in location of the IHS. Additionally, or alternatively, the state change may include a change in user proximity to the IHS. Additionally, or alternatively, the state change may include a change in IHS posture. Additionally, or alternatively, the state change may include a change in power state of the IHS. Additionally, or alternatively, the state change may include a change in battery charge level of the IHS.

The application may be configured to identify the compute resource based, at least in part, upon a priority of the workload. The platform framework may include an arbitration service configured to execute the arbitration policy based upon a processing of a plurality of runtime objects representing the context. Moreover, the plurality of runtime objects may include at least one of: operating temperature objects, battery metrics objects, IHS performance objects, IHS posture objects, audio capture objects, video capture objects, IHS location objects, or user proximity objects.

The program instructions, upon execution, may cause the IHS to disable a participant of the platform framework in response to the state change, where the participant produces at least one of the runtime objects. The compute resource may include a hardware accelerator core.

In another illustrative, non-limiting embodiment, a memory storage device may have program instructions stored thereon that, upon execution by an IHS, cause the IHS to: receive a notification, at an application from a platform framework via an API, of a state change with respect to an arbitration policy based upon a change in context; in response to the notification, provide, by the application to the platform framework via the API, an identification of at least one compute resource to execute a workload.

The application may be registered with the platform framework to be notified of the state change. The state change may include a change in at least one of: a location of the IHS, user proximity to the IHS, IHS posture, a power state of the IHS, or a battery charge level of the IHS. The platform framework may include an arbitration service configured to execute the arbitration policy based upon a processing of a plurality of runtime objects representing the context, where the program instructions, upon execution, further cause the IHS to disable a participant of the platform framework in response to the state change, and where the participant produces at least one of the runtime objects.

In yet another illustrative, non-limiting embodiment, a method may include: receiving a notification, at an application from a platform framework via an API, of a state change with respect to an arbitration policy based upon a change in context; in response to the notification, providing, by the application to the platform framework via the API, a request to enable or disable a participant of the platform framework, where the participant produces at least one runtime object representing the context. The method may also include, in response to the notification, providing, by the application to the platform framework via the API, an identification of at least one compute resource to execute a workload.

The application may be registered with the platform framework to be notified of the state change. The state change may include a change in at least one of: a location of the IHS, user proximity to the IHS, IHS posture, a power state of the IHS, or a battery charge level of the IHS.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

In this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
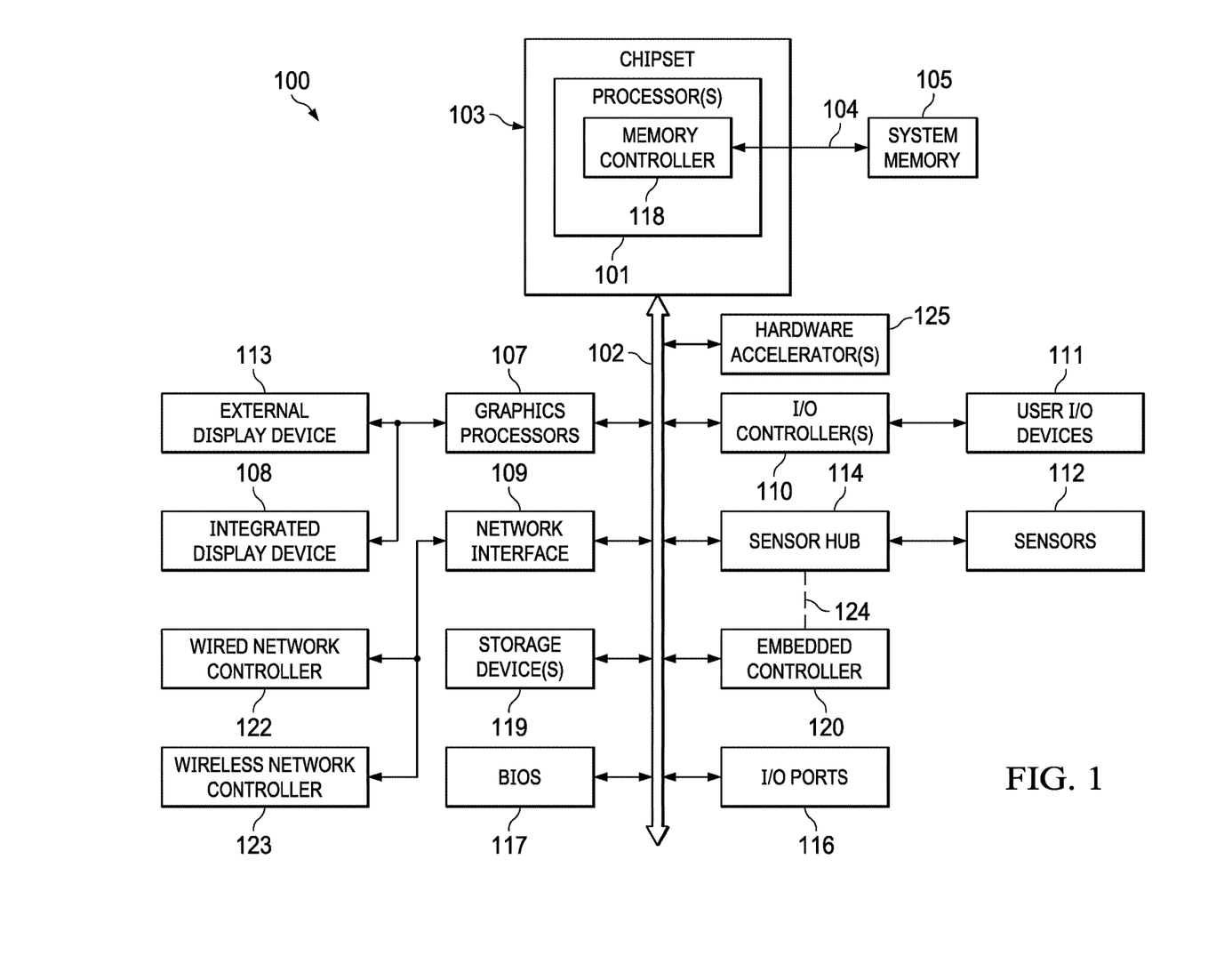
FIG. 1 is a block diagram of an example of hardware components of an Information Handling System (IHS), according to some embodiments.

FIG. 1 is a block diagram illustrating components of IHS 100 configured according to some embodiments. As shown, IHS 100 includes one or more processor(s) 101, such as a Central Processing Unit (CPU), that execute code retrieved from system memory 105.

Although IHS 100 is illustrated with a single processor, other embodiments may include two or more processors, that may each be configured identically, or to provide specialized processing operations. Processor(s) 101 may include any processor capable of executing instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, processor(s) 101 includes integrated memory controller 118 that may be implemented directly within its circuitry. Alternatively, memory controller 118 may be a separate integrated circuit that is located on the same die as processor(s) 101. Memory controller 118 may be configured to manage the transfer of data to and from system memory 105 of IHS 100 via high-speed memory interface 104.

System memory 105 is coupled to processor(s) 101 and provides processor(s) 101 with a high-speed memory that may be used in the execution of computer program instructions. For example, system memory 105 may include memory components, such as static RAM (SRAM), dynamic RAM (DRAM), NAND Flash memory, suitable for supporting high-speed memory operations by the processor 101. In certain embodiments, system memory 105 may combine both persistent, non-volatile, and volatile memor(ies). In certain embodiments, system memory 105 may include multiple removable memory modules.

IHS 100 utilizes chipset 103 that may include one or more integrated circuits coupled to processor(s) 101. In this embodiment, processor(s) 101 is depicted as a component of chipset 103. In other embodiments, all of chipset 103, or portions of chipset 103 may be implemented directly within the integrated circuitry of processor(s) 101. Chipset 103 provides processor(s) 101 with access to a variety of resources accessible via bus 102.

In IHS 100, bus 102 is illustrated as a single element. However, other embodiments may utilize any number of separate buses to provide the illustrated pathways served by bus 102.

In various embodiments, IHS 100 may include one or more I/O ports 116 that may support removeable couplings with various types of external devices and systems, including removeable couplings with peripheral devices that may be configured for operation by a particular user of IHS 100. For instance, I/O 116 ports may include USB (Universal Serial Bus) ports, by which a variety of external devices may be coupled to IHS 100. In addition to, or instead of USB ports, I/O ports 116 may include various types of physical I/O ports that are accessible to a user via an enclosure or chassis of IHS 100.

In certain embodiments, chipset 103 may additionally utilize one or more I/O controllers 110 that may each support the operation of hardware components such as user I/O devices 111. User I/O devices 111 may include peripheral components that are physically coupled to I/O port 116 and/or peripheral components wirelessly coupled to IHS 100 via network interface 109.

In various implementations, I/O controller 110 may support the operation of one or more user I/O devices 110 such as a keyboard, mouse, touchpad, touchscreen, microphone, speakers, camera and other input and output devices that may be coupled to IHS 100. User I/O devices 111 may interface with an I/O controller 110 through wired or wireless couplings supported by IHS 100. In some cases, I/O controllers 110 may support configurable operation of supported peripheral devices, such as user I/O devices 111.

As illustrated, a variety of additional resources may be coupled to processor(s) 101 of IHS 100 through chipset 103. For instance, chipset 103 may be coupled to network interface 109 to enable different types of network connectivity. IHS 100 may also include one or more Network Interface Controllers (NICs) 122 and 123, each of which may implement the hardware required for communicating via a specific networking technology, such as Wi-Fi, BLUETOOTH, Ethernet and mobile cellular networks (e.g., CDMA, TDMA, LTE).

Network interface 109 may support network connections by wired network controller(s) 122 and wireless network controller(s) 123. Each network controller 122 and 123 may be coupled via various buses to chipset 103 to support different types of network connectivity, such as the network connectivity utilized by IHS 100.

Chipset 103 may also provide access to one or more display device(s) 108 and/or 113 via graphics processor(s) 107. Graphics processor(s) 107 may be included within a video card, graphics card, and/or an embedded controller installed within IHS 100. Additionally, or alternatively, graphics processor(s) 107 may be integrated within processor(s) 101, such as a component of a system-on-chip (SoC). Graphics processor(s) 107 may generate display information and provide the generated information to display device(s) 108 and/or 113.

One or more display devices 108 and/or 113 are coupled to IHS 100 and may utilize LCD, LED, OLED, or other display technologies (e.g., flexible displays, etc.). Each display device 108 and 113 may be capable of receiving touch inputs such as via a touch controller that may be an embedded component of the display device 108 and/or 113 or graphics processor(s) 107, for example, or may be a separate component of IHS 100 accessed via bus 102. In some cases, power to graphics processor(s) 107, integrated display device 108 and/or external display 133 may be turned off or configured to operate at minimal power levels in response to IHS 100 entering a low-power state (e.g., standby).

As illustrated, IHS 100 may support integrated display device 108, such as a display integrated into a laptop, tablet, 2-in-1 convertible device, or mobile device. IHS 100 may also support use of one or more external displays 113, such as external monitors that may be coupled to IHS 100 via various types of couplings, such as by connecting a cable from the external display 113 to external I/O port 116 of the IHS 100, via wireless docking station, etc. In certain scenarios, the operation of integrated displays 108 and external displays 113 may be configured for a particular user. For instance, a particular user may prefer specific brightness settings that may vary the display brightness based on time of day and ambient lighting conditions.

Chipset 103 also provides processor(s) 101 with access to one or more storage devices 119. In various embodiments, storage device 119 may be integral to IHS 100 or may be external to IHS 100. Moreover, storage device 119 may be accessed via a storage controller that may be an integrated component of the storage device.

Generally, storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud system or enterprise data management system that is accessible via network interface 109.

As illustrated, IHS 100 also includes Basic Input/Output System (BIOS) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. Under execution, BIOS 117 instructions may facilitate the loading of an operating system (OS) (e.g., WINDOWS, MACOS, iOS, ANDROID, LINUX, etc.) for use by IHS 100.

BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 100 embodiments may utilize sensor hub 114 (e.g., INTEL Sensor Hub or "ISH," etc.) capable of sampling and/or collecting data from a variety of hardware sensors 112. For instance, sensors 112, may be disposed within IHS 100, and/or display 110, and/or a hinge coupling a display portion to a keyboard portion of IHS 100, and may include, but are not limited to: electric, magnetic, hall effect, radio, optical, infrared, thermal, force, pressure, touch, acoustic, ultrasonic, proximity, position, location, angle (e.g., hinge angle), deformation, bending (e.g., of a flexible display), orientation, movement, velocity, rotation, acceleration, bag state (in or out of a bag), and/or lid sensor(s) (open or closed).

In some cases, one or more sensors 112 may be part of a keyboard or other input device. Processor(s) 101 may be configured to process information received from sensors 112 through sensor hub 114, and to perform methods for prioritizing the pre-loading of applications with a constrained memory budget using contextual information obtained from sensors 112.

For instance, during operation of IHS 100, the user may open, close, flip, swivel, or rotate display 108 to produce different IHS postures. In some cases, processor(s) 101 may be configured to determine a current posture of IHS 100 using sensors 112 (e.g., a lid sensor, a hinge sensor, etc.). For example, in a dual-display IHS implementation, when a first display 108 (in a first IHS portion) is folded against a second display 108 (in a second IHS portion) so that the two displays have their backs against each other, IHS 100 may be said to have assumed a book posture. Other postures may include a table posture, a display posture, a laptop posture, a stand posture, or a tent posture, depending upon whether IHS 100 is stationary, moving, horizontal, resting at a different angle, and/or its orientation (landscape vs. portrait).

For instance, in a laptop posture, a first display surface of a display 108 may be facing the user at an obtuse angle with respect to a second display surface of a display 108 or a physical keyboard portion. In a tablet posture, a first display surface may be at a straight angle with respect to a second display surface or a physical keyboard portion. And, in a book posture, a first display surface may have its back (e.g., chassis) resting against the back of a second display surface or a physical keyboard portion.

It should be noted that the aforementioned postures and their various respective keyboard states are described for sake of illustration only. In different embodiments, other postures may be used, for example, depending upon the type of hinge coupling the displays, the number of displays used, or other accessories.

In other cases, processor(s) 101 may process user presence data received by sensors 112 and may determine, for example, whether an IHS's end-user is present or absent. Moreover, in situations where the end-user is present before IHS 100, processor(s) 101 may further determine a distance of the end-user from IHS 100 continuously or at predetermined time intervals. The detected or calculated distances may be used by processor(s) 101 to classify the user as being in the IHS's near-field (user's position<threshold distance A), mid-field (threshold distance A<user's position<threshold distance B, where B>A), or far-field (user's position>threshold distance C, where C>B) with respect to IHS 100 and/or display 108.

More generally, in various implementations, processor(s) 101 may receive and/or produce context information using sensors 112 via sensor hub 114, including one or more of, for example: a user's presence or proximity state (e.g., present, near-field, mid-field, far-field, and/or absent using a Time-of-Flight or "ToF" sensor, visual image sensor, infrared sensor, and/or other suitable sensor 112), a facial expression of the user (e.g., usable for mood or intent classification), a direction and focus of the user's gaze, a user's hand gesture, a user's voice, an IHS location (e.g., based on the location of a wireless access point or Global Positioning System, etc.), IHS movement (e.g., from an accelerometer or gyroscopic sensor), lid state (e.g., of a laptop or other hinged form factor), hinge angle (e.g., in degrees), IHS posture (e.g., laptop, tablet, book, tent, display, etc.), whether the IHS is coupled to a dock or docking station (e.g., wired or wireless), a distance between the user and at least one of: the IHS, the keyboard, or a display coupled to the IHS, a type of keyboard (e.g., a physical keyboard integrated into IHS 100, a physical keyboard external to IHS 100, or an on-screen keyboard), whether the user operating the keyboard is typing with one or two hands (e.g., by determine whether or not the user is holding a stylus, or the like), a time of day, software application(s) under execution in focus for receiving keyboard input, whether IHS 100 is inside or outside of a carrying bag or case, a level of ambient lighting, a battery charge level, whether IHS 100 is operating from battery power or is plugged into an AC power source (e.g., whether the IHS is operating in AC-only mode, DC-only mode, or AC+DC mode), a power mode or rate of power consumption of various components of IHS 100 (e.g., CPU 101, GPU 107, system memory 105, etc.).

In certain embodiments, sensor hub 114 may be an independent microcontroller or other logic unit that is coupled to the motherboard of IHS 100. Sensor hub 114 may be a component of an integrated system-on-chip incorporated into processor(s) 101, and it may communicate with chipset 103 via a bus connection such as an Inter-Integrated Circuit ($I^2C$) bus or other suitable type of bus connection. Sensor hub 114 may also utilize an $I^2C$ bus for communicating with various sensors supported by IHS 100.

As illustrated, IHS 100 may utilize embedded controller (EC) 120, which may be a motherboard component of IHS 100 and may include one or more logic units. In certain embodiments, EC 120 may operate from a separate power plane from the main/host processor(s) 101 and thus the OS operations of IHS 100. Firmware instructions utilized by EC 120 may be used to operate a secure execution system that may include operations for providing various core functions of IHS 100, such as power management, management of operating modes in which IHS 100 may be physically configured and support for certain integrated I/O functions. In some embodiments, EC 120 and sensor hub 114 may communicate via an out-of-band signaling pathway or bus 124.

In various embodiments, chipset 103 may provide processor 101 with access to hardware accelerator(s) 125. Examples of hardware accelerator(s) 125 may include, but are not limited to, INTEL's Gaussian Neural Accelerator (GNA), Audio and Contextual Engine (ACE), Vision Processing Unit (VPU), etc. In some cases, hardware accelerator(s) 125 may be used to perform ML and/or AI operations offloaded by processor 101. For instance, hardware accelerator(s) 125 may load several audio signatures and/or settings, and it may identify an audio source by comparing an audio input to one or more audio signatures until it finds a match.

In some cases, however, hardware accelerator(s) 125 may have significant model concurrency and/or processing latency constraints relative to processor(s) 101. Accordingly, in some cases, context information may be used to select a subset and/or size of data signatures (e.g., audio), also number and/or complexity of models, number of concurrent models (e.g., only two or three models can be processed at a time), and/or latency characteristics (e.g., with 4 signatures or more, detection latency becomes unacceptable) of hardware accelerator(s) 125.

In various embodiments, IHS 100 may not include each of the components shown in FIG. 1. Moreover, IHS 100 may include various other components in addition to those that are shown in FIG. 1. Some components that are represented as separate components in FIG. 1 may be integrated with other components. For example, in some implementations, all or a portion of the features provided by the illustrated components may instead be provided by an SoC.

In a conventional IHS, each application would have to know how to communicate with each specific hardware endpoint 101-124 it needs, which can place a heavy burden on software developers. Moreover, in many situations, multiple applications may request the same information from the same hardware endpoint, thus resulting in inefficiencies due to parallel and/or overlapping code and execution paths used by these applications to perform get and set methods with that same endpoint.

To address these, and other concerns, a platform framework as described herein may enable an overall, comprehensive system management orchestration of IHS 100. Particularly, such a platform framework may provide, among other features, the scalability of multiple applications requesting direct hardware endpoint (e.g., 101-124) access. Additionally, or alternatively, a platform framework as described herein may provide performance optimizations and increased operational stability to various IHS environments.

Figure 2:
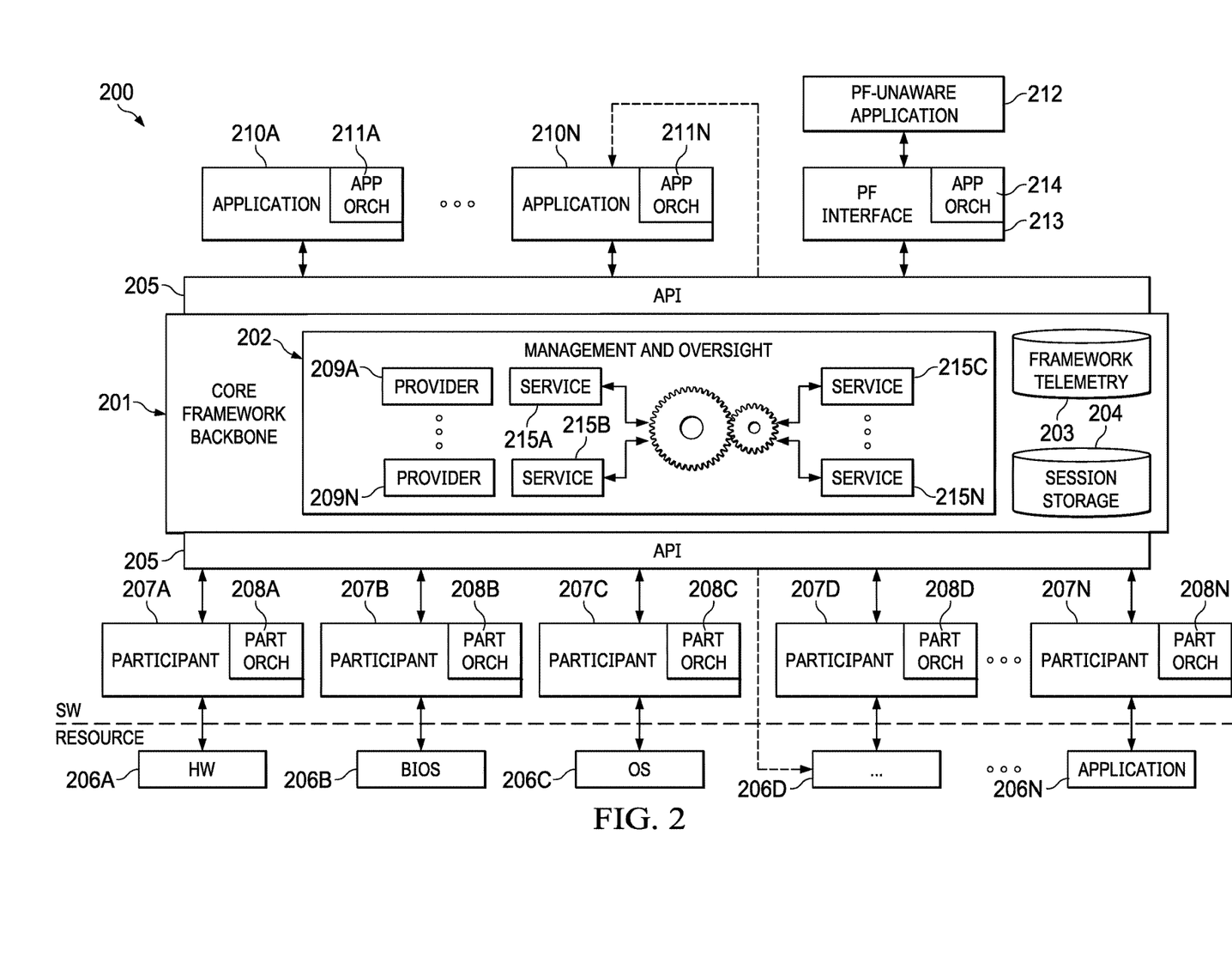
FIG. 2 is a block diagram illustrating an example of a platform framework deployed in an IHS, according to some embodiments.

FIG. 2 is a block diagram illustrating an example of platform framework 200. In some embodiments, IHS 100 may instantiate each element of platform framework 200 through the execution of program instructions, stored in a memory (e.g., system memory 105, storage device(s) 119, etc.), by one or more processors or controllers (e.g., processor(s) 101, GPU 107, hardware accelerators, etc.).

In some implementations, platform framework 200 may be supported by and/or executed within an OS used by IHS 100, and it may be scaled across user and kernel spaces. Additionally, or alternatively, platform framework 200 may be provided as a software library or an ".exe" file.

As shown, platform framework 200 includes core framework backbone 201 and Application Programming Interface (API) 205. Core framework backbone 201 includes management and oversight engine 202 (with services 215A-N), framework telemetry database 203, and session storage database 204.

In operation, platform framework 200 enables the management and orchestration of its participants' communications. The term "participant," as used herein, refers to any entity (e.g., hardware device driver, software module, etc.) configured to register with platform framework 200 by issuing a registration command to management and oversight engine 202 via API 205. Upon registration, each participant may receive a handle usable by services 215A-N within management and oversight engine 202 (and other participants) to address it. In some cases, the handle may be validated by Root-of-Trust (RoT) hardware (e.g., EC 120) as part of the participant registration process.

In various embodiments, platform framework 200 may include at least three different types of participants: producers, consumers, and providers.

Producers are entities (e.g., 207A-N) configured to advertise or publish the capabilities (e.g., variables, primitives, etc.) and statuses of associated hardware (e.g., 206A) or software components (e.g., 206N) to platform framework 200 via API 205, which can then be consumed and/or modified by other participants (e.g., 210A-N). Producers (e.g., 207A-N) may also execute operations with respect to associated hardware components (e.g., 206A-N) based upon instructions (e.g., "set" commands) received from other participants (e.g., 210A-N) via API 205.

On the producer side, resources 206A-N may include, for example, hardware 206A, BIOS 206B, OS 206C, application 206D (a producer role for consumer application 210N), and application 206N (a producer-only application). Each of resources 206A-N may have a producer driver or module 207A-N (a "producer") associated therewith, and each such producer 207A-N may have corresponding orchestrator logic 208A-N that enables its registration and subsequent communications with platform framework 200 via API 205. Once registered, producers 207A-N may provide information to platform framework 200 on their own, upon request by management and oversight engine 202, and/or upon request by any consumer (e.g., 210A-N).

Consumers are entities (e.g., 210A-N) that retrieve data (e.g., a single data item, a collection of data items, data subscribed to from selected producers, etc.) from platform framework 200 using API 205 to then perform one or more actions.

On the consumer side, each of consuming applications 210A-N (a "consumer") may have a corresponding orchestrator logic 211A-N that also enables registration and subsequent communications with platform framework 200 using API 205. For example, applications 210A-N may use API 205 commands request data via platform framework 200 from any registered producer 207A-N or provider 209A-N. In the case of application 212 that is not natively aware of, or compliant with, platform framework 200 (e.g., the application uses direct-to-driver access), interface application or plugin 213 and orchestrator logic 214 may enable its inter-operation with platform framework 200 via API 205.

In various embodiments, orchestrator logic 208A-N, 211A-N, and 214 are each a set of APIs to manage a respective entity, such as applications 211A-N, participants 207A-N, and PF interface 213. Particularly, each entity may use its orchestrator interface to register themselves against platform framework 200, with a list of methods exposed within the orchestrator logic's APIs to query for capabilities, events to listen/respond on, and other orchestration operations tied to routing and efficiency.

In some cases, a single application may operate both as a consumer and a producer with respect to platform framework 200. For example, application 210N may operate as a consumer to receive BIOS data from BIOS 206B via API 205. In response to receiving data from producer 207B associated with BIOS 206B, application 210N may execute one of more rules to change the IHS 100's thermal settings. As such, the same application 210N may also operate as producer 206D, for example, by registering and/or advertising its thermal settings to platform framework 200 for consumption by other participants (e.g., 210A) via API 205.

Providers 209A-N are runtime objects that collect data from multiple participants and make intelligent modifications to that data for delivery to other participants (e.g., consumers) through platform framework 200. Despite a provider (e.g., 209A) being an entity within management and oversight engine 202, it may be registered and/or advertised with platform framework 200 as if it were one of producers 207A-N.

As an example, a status provider (e.g., 209A) may collect hardware information from hardware resource(s) 206A and BIOS information (e.g., from BIOS 206B), make a status determination for IHS 100 based upon that data, and deliver the status to platform framework 200 as if it were a hardware component or driver. As another example, a status provider (e.g., 209A) may receive user presence information from sensor hub 114 (e.g., hardware 206A), receive human interface device (HID) readings from OS 209C, make its user own presence determination based upon some concatenation of those two inputs, and publish its user presence determination to platform framework 200 such that other participants do not have to make redundant findings.

API 205 may include a set of commands commonly required of every participant (consumers and producers) of platform framework 200, for example, to perform get or set operations or methods. Predominantly, producers 207A-N may use API 205 to register, advertise, and provide data to consumers (e.g., 210A-N), whereas consumers 210A-N may use API 205 to receive that data and to send commands to producers 207A-N.

Moreover, applications 210A-N may discover all other participants (e.g., hardware 206A and enumerated/supported capabilities, etc.) that are registered into platform framework 200 using API 205. For example, if hardware 206A includes graphics subsystem 107, application 210A may use API 205 to obtain the firmware version, frame rate, operating temperature, integrated or external display, etc. that hardware 206A provides to platform framework 200, also via API 205.

Applications 210A-N may use information provided by platform framework 200 entirely outside of it, and/or they may make one or more determinations and configure another participant of platform framework 200. For example, application 210A may retrieve temperature information provided by hardware 206A (e.g., GPU 107), it may determine that an operating temperature is too high (i.e., above a selected threshold), and, in response, it may send a notification to BIOS 206B via producer 207B to configure the IHS's thermal settings according to a thermal policy. It should be noted that, in this example, by using API 205, application 210A does not need to have any information or knowledge about how to communicate directly with specific hardware 206A and/or BIOS component 206B.

In various implementations, API 205 may be extendable. Once a participant subscribes to, or registers with, platform framework 200 via API 205, in addition to standard commands provided by API 205 itself (e.g., get, set, discovery, notify, multicast, etc.), the registered participant may also advertise the availability of additional commands or services.

For instance, express sign-in and/or session management application 210A, thermal policy management application 210B, and privacy application 210C may each need to obtain information from one or more user presence/proximity sensors (e.g., sensors 112) participating in platform framework 200 as hardware providers 206A. In this case, the extensibility of API 205 may allow for the abstraction and arbitration of two or more sensors 112 at the platform framework 200 layer; instead of having every application 210A-C reach directly into sensors 112 and potentially crash those devices and/or driver stacks (e.g., due to contention).

As another example, raw thermal and/or power information may be provided into platform framework 200 by one or more sensors 112 as hardware producers 207A and consumed by two or more applications, such as thermal management application 210A and battery management application 210B, each of which may subscribe to that information, make one or more calculations or determinations, and send responsive commands to BIOS 206C using API 205 in the absence of any specific tools for communicate directly with hardware 206A or BIOS 206B.

As yet another example, provider 209A may communicate with an application 211A, such as a battery management application or OS service, and it may set application or OS service 211A to a particular configuration (e.g., a battery performance "slider bar") using API 205 without specific knowledge of how to communicate directly with that application or OS service, and/or without knowing what the application or OS service is; thus platform framework 200 effectively renders provider 209A application and/or OS agnostic.

Within core framework backbone 201, management and oversight engine 202 includes services 215A-N within platform framework 200 that may be leveraged for the operation of all participants. Examples of services 215A-N include, but are not limited to: registration (e.g., configured to enable a participant to register and/or advertise data with platform framework 200), notification (e.g., configured to notify any registered participant of a status change or incoming data), communication/translation between user and kernel modes (e.g., configured to allow code executing in kernel mode to traverse into user mode and vice-versa), storage (e.g., configured to enable any registered participant to store data in session storage database 204), data aggregation (e.g., configured to enable combinations of various status changes or data from the same or multiple participants), telemetry (e.g., configured to enable collection and storage of data usable for monitoring and debugging), arbitration (e.g., configured to enable selection of one among two or more data sources or requests based upon an arbitration policy), manageability (e.g., configured to manage services 215A-N and/or databases 203/204 of platform framework 200), API engine (e.g., configured to extend or restrict available commands), etc.

Framework telemetry database 203 may include, for example, an identification of participants that are registered, data produced by those participants, communication metrics, error metrics, etc. that may be used for tracking and debugging platform framework 200. Session storage database 204 may include local storage for sessions established and conducted between different participants (e.g., data storage, queues, memory allocation parameters, etc.).

In some implementations, a containerized workspace and/ or an application executed therewithin may participate as a producer (e.g., 207A-N/206A-N) or as a consumer (e.g., 210A-N) of platform framework 200. Particularly, IHS 100 may be employed to instantiate, manage, and/or terminate a secure workspace that may provide the user of IHS 100 with access to protected data in an isolated software environment in which the protected data is segregated from: the OS of IHS 100, other applications executed by IHS 100, other workspaces operating on IHS 100 and, to a certain extent, the hardware of IHS 100. In some embodiments, the construction of a workspace for a particular purpose and for use in a particular context may be orchestrated remotely from the IHS 100 by a workspace orchestration service. In some embodiments, portions of the workspace orchestration may be performed locally on IHS 100.

In some embodiments, EC 120 or a remote access controller (RAC) coupled to processor(s) 101 may perform various operations in support of the delivery and deployment of workspaces to IHS 100. In certain embodiments, EC 120 may interoperate with a remote orchestration service via the described out-of-band communications pathways that are isolated from the OS that runs on IHS 100. In some embodiments, a network adapter that is distinct from the network controller utilized by the OS of IHS 100 may support out-of-band communications between EC 120 and a remote orchestration service. Via this out-of-band signaling pathway, EC 120 may receive authorization information that may be used for secure delivery and deployment of a workspace to IHS 100 and to support secure communication channels between deployed workspaces and various capabilities supported by IHS 100, while still maintaining isolation of the workspaces from the hardware and OS of IHS 100.

In some embodiments, authorization and cryptographic information received by EC 120 from a workspace orchestration service may be stored to a secured memory. In some embodiments, EC 120 may access such secured memory via an $I^2C$ sideband signaling pathway. EC 120 may support execution of a trusted operating environment that supports secure operations that are used to deploy a workspace on IHS 100. In certain embodiments, EC 120 may calculate signatures that uniquely identify various hardware and software components of IHS 100. For instance, remote EC 120 may calculate hash values based on instructions and other information used to configure and operate hardware and/or software components of IHS 100.

For instance, EC 120 may calculate a hash value based on firmware and on other instructions or settings of a component of a hardware component. In some embodiments, hash values may be calculated in this manner as part of a trusted manufacturing process of IHS 100 and may be stored in the secure storage as reference signatures used to validate the integrity of these components later. In certain embodiments, a remote orchestration service supporting the deployment of workspaces to IHS 100 may verify the integrity of EC 120 in a similar manner, by calculating a signature of EC 120 and comparing it to a reference signature calculated during a trusted process for manufacture of IHS 100.

EC 120 may execute a local management agent configured to receive a workspace definition from the workspace orchestration service and instantiate a corresponding workspace. In this disclosure, "workspace definition" generally refers to a collection of attributes that describe aspects a workspace that is assembled, initialized, deployed and operated in a manner that satisfies a security target (e.g., the definition presents an attack surface that presents an acceptable level of risk) and a productivity target (e.g., the definition provides a requisite level of access to data and applications with an upper limit on latency of the workspace) in light of a security context (e.g., location, patch level, threat information, network connectivity, etc.) and a productivity context (e.g., performance characteristics of the IHS 100, network speed, workspace responsiveness and latency) in which the workspace is to be deployed. A workspace definition may enable fluidity of migration of an instantiated workspace, since the definition supports the ability for a workspace to be assembled on any IHS 100 configured for operation with the workspace orchestration service.

In specifying capabilities and constraints of a workspace, a workspace definition (e.g., in the form of an XML, file, etc.) may prescribe one or more of: authentication requirements for a user, types of containment and/or isolation of the workspace (e.g., local application, sandbox, docker container, progressive web application (PWA), Virtual Desktop Infrastructure (VDI)), applications that can be executed in the defined containment of the workspace with access to one or more data sources, security components that reduce the scope of the security target presented by the productivity environment (e.g., DELL DATA GUARDIAN from DELL TECHNOLOGIES INC., anti-virus software), the data sources to be accessed and requirements for routing that data to and from the workspace containment (e.g., use of VPN, minimum encryption strength), workspace capabilities available to independently attach other resources, whether or not the workspace supports operability across distinct, distributed instances of platform framework 200 (e.g., by including or excluding an identity of another platform framework, or an identity of another workspace with access to a platform framework).

In some implementations, workspace definitions may be based at least in part on static policies or rules defined, for example, by an enterprise's Information Technology (IT) personnel. In some implementations, static rules may be combined and improved upon by machine learning (ML) and/or artificial intelligence (AI) algorithms that evaluate historical productivity and security data collected as workspaces are life cycled. In this manner, rules may be dynamically modified over time to generate improved workspace definitions. If it is determined, for instance, that a user dynamically adds a text editor every time he uses MICROSOFT VISUAL STUDIO from MICROSOFT CORPORATION, then the workspace orchestration service may autonomously add that application to the default workspace definition for that user.

During operation, as an instantiated workspace is manipulated by a user, new productivity and security context information related to the behavior or use of data may be collected by the local management agent, thus resulting in a change to the productivity or security context of the workspace. To the extent the user's behavioral analytics, device telemetry, and/or the environment has changed by a selected degree, these changes in context may serve as additional input for a reevaluation, and the result may trigger the remote orchestration service to produce a new workspace definition (e.g., adding or removing access to the workspace as a consumer or producer to an external or distributed platform framework), extinguish the current workspace, and/or migrate contents of the current workspace to a new workspace instantiated based on the new workspace definition.

In some cases, platform framework 200 may be extensible or distributed. For example, different instances or portions of platform framework 200 may be executed by different processing components (e.g., processor(s) 101 and EC 120) of IHS 100, or across different IHSs. Additionally, or alternatively, independent instances of platform framework 200 may be executed by different workspaces and in secure communications with each other, such that a participant, service, or runtime object's handle may identify the particular platform framework 200 that the participant or service is registered with. Services between these different instances of platform frameworks may communicate with each other via an Interprocess Communication (IPC) resource specified in a handle provided by the workspace orchestration service for communications with the workspace(s) involved.

In some embodiments, a workspace definition may specify the platform framework namespaces that a workspace will rely upon. Producers and providers may be associated with namespaces that are supported by a platform framework. For example, producers associated with each of the cameras that are available may be registered within a camera namespace that is supported by platform framework 200. In the same manner, producers and providers that provide user presence detection capabilities may be registered within a user presence detection namespace that is supported by platform framework 200. Other examples of namespaces may include, but are not limited to: a location namespace, a posture namespace, a network namespace, an SoC namespace, etc.

For instance, a workspace definition may specify registration of a workspace in a user presence detection namespace of the IHS, where user presence information may be utilized by the workspace in enforcing security protocols also set forth in the workspace definition, such as obfuscating the graphical interfaces of the workspace upon detecting a lack of a particular user in proximity to the IHS, thus preserving the confidentiality of sensitive data provided via the workspace.

In some cases, the workspace definition of a workspace may specify that the workspace: instantiate its own a platform framework, use a platform framework instantiated within another workspace (in the same or different IHS), and/or use a combination of different instances of platform frameworks (one or more of which may be instantiated by another workspace). Moreover, the platform framework option as prescribed by a workspace definition may be based upon the resolution of any of the aforementioned contextual rules (e.g., based on IHS posture, location, user presence, etc.).

As used herein, the term "runtime object" refers to a piece of code (e.g., a set of program instructions) or information that can be instantiated and/or executed in runtime without the need for explicit compilation. For example, in the context of an arbitration operation, the code that executes the arbitration may already be compiled, whereas the polic(ies) that the code enforces may change at runtime (e.g., by a user's command in real time) and therefore may be considered "runtime objects."

In various embodiments, systems and methods described herein may provide platform framework orchestration and discovery. In a conventional system, if an application requests usage of a resource (e.g., participants 207A-N/206A-N) that happens to be inaccessible (or accessible only in a used, reduced, or scaled capacity), the request may result in a timeout or error event and the application may be forced to take alternative action—e.g., forego using the resource altogether, seek another resource, wait-and-retry, etc. Using systems and methods described herein, however, an application may be capable of determining the availability of a resource, via platform framework 200, prior to requesting actual usage of that resource. This can avoid request deadlocking and/or the resource entering a non-functional state, which in turn would render any other application that relies upon proper operation of that resource to also not operate properly.

For example, during a voice collection operation, an audio application may need to execute machine learning (ML) or artificial intelligence (AI) models to identify and remove background noise. The voice collection aspects of the processing may be allocated to processor(s) 101, whereas the background noise process may be offloaded to hardware accelerator 125 (e.g., a GNA SoC). The audio application may call into the GNA SoC to set a model. If the GNA SoC is not available because it is executing another model, the application will ordinarily wait until the other model is completed (each application is responsible for instituting its own timeout processes, which can lead to potential timing challenges and user experience impact).

Using systems and methods described herein, however, the audio application (e.g., 210A) may be capable of discovering the availability and/or capabilities of the GNA SoC (e.g., 207A-N/206A-N) from platform framework 200 via API 205, prior to requesting usage of the SoC. Accordingly, the audio application may use the discovery information to decide whether to wait to the availability of the SoC (e.g., instead of rolling over), to prioritize or step down a list of other models or loads, to change one or more execution parameters, to select a subset of one or more cores for processing, etc.

As another example, a provider (e.g., 209A) may be registered with platform framework 200 via API 205 to publish, request, and/or respond to get/set commands from an application (e.g., 210A). If another application is not aware of the provider's current resource constraints, that other application may request provider access but get locked out. Using systems and methods described herein, however, all registered applications (e.g., 210A-N) may be capable of discovering the availability and/or capabilities of any provider (e.g., 209A-N) from platform framework 200, prior to requesting usage of that provider.

As yet another example, an application may request access from a hardware accelerator to perform a model evaluation, but the hardware accelerator may not provide a response to the application's access request in time and the application may roll over to other processing. Using systems and methods described herein, however, the application (e.g., 210A-N) may be capable of discovering the availability and/or capabilities of the hardware accelerator (e.g., 206A/207A) from platform framework 200 via API 205, prior to requesting usage of the hardware.

In some embodiments, a first service or application (e.g., 207A) may be registered with platform framework 205 as a producer having downstream communications with an associated hardware device (e.g., 206A). A discovery service (e.g., 215A) within management and oversight engine 202 may store availability status (e.g., available, in-use, scaled, etc.) of registered participants in session storage database 204. A second service or application (e.g., 210A) registered with platform framework 200 as a consumer may use the discovery service (e.g., 215A) to request access to details of registered producers (e.g., calling resource status to verify commands explicitly).

In other embodiments, discovery service (e.g., 215A) may dynamically reject requests targeting unavailable objects. In yet other embodiments, a service or application may implement a callback with a timer for managed arbitration with another service or application (e.g., to verify or select a capability, value, or metric), for example, based upon context information, while connected to platform framework 200.

Figure 3:
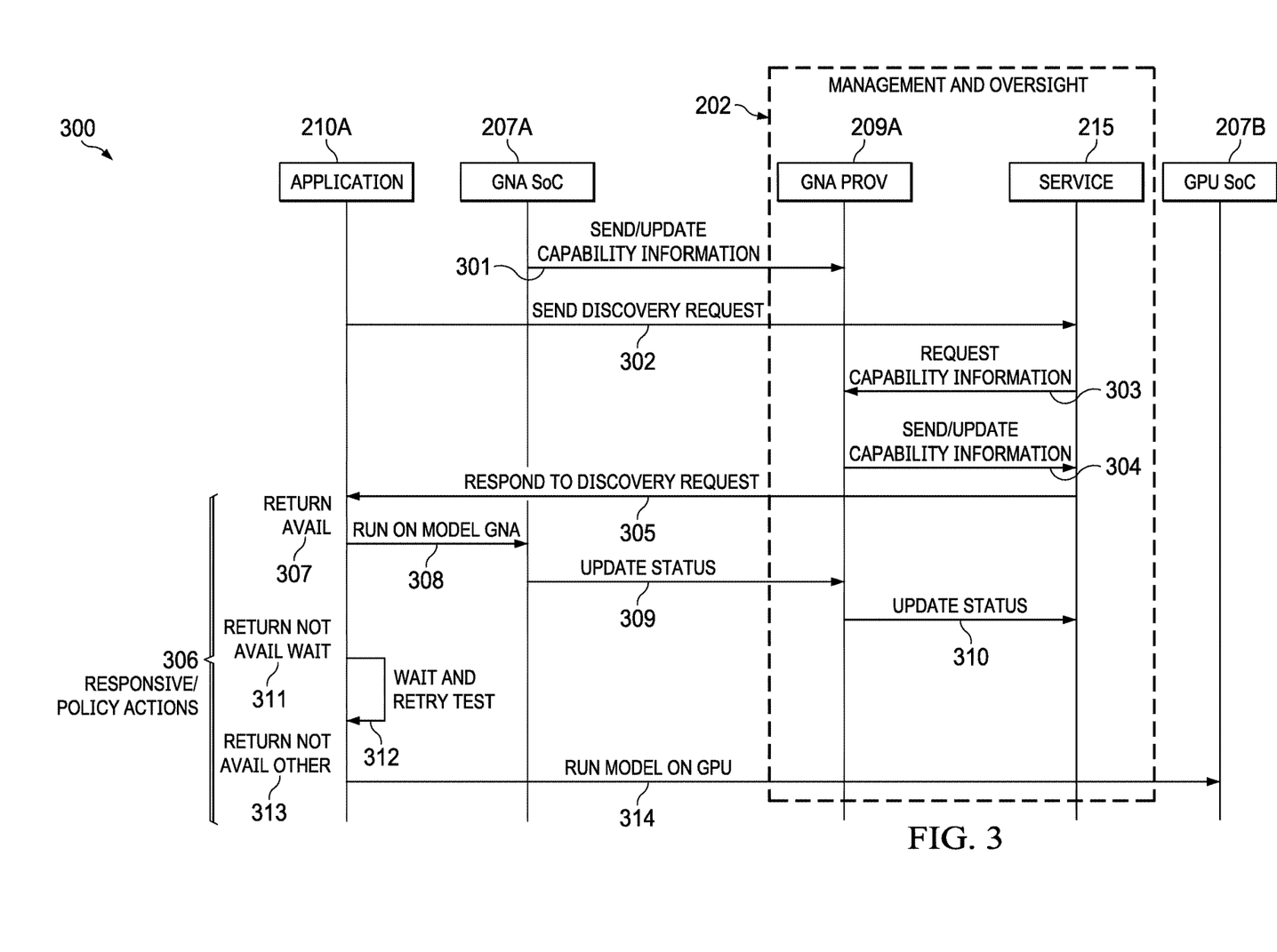
FIG. 3 is a message diagram illustrating an example of a method for platform framework orchestration, according to some embodiments.

FIG. 3 is a message diagram illustrating an example of method 300 for platform framework orchestration, according to some embodiments. Application 210A may be registered as a consumer and GNA provider 209A may be registered as a provider with platform framework 200. In operation 301, GNA SoC participant 207A (e.g., a device driver associated with the underlying hardware SoC component) sends and/or updates its capability and/or status information with GNA provider 209A (e.g., availability status, unavailability status, availability metric, unavailability metric, current processing load, current processing availability, load or availability of individual cores, memory usage, processing queues, processing queues per core, etc.).

In operation 302, application 210A sends a discovery request to discovery service 215A of management and oversight engine 202 via API 205. In response, in operation 303, discovery service 215A requests capability information from GNA provider 209A. In operation 304, GNA provider 209A provides the capability information of the underlying GNA SoC participant 207A and/or hardware 206A to discovery service 215A. Then, in operation 305, discovery service 215A responds to the discovery request by transmitting at least a portion of the capability information to application 210A via API 205.

As such, in various embodiments, platform framework 200 may be instrumented to perform discovery operations of its various participants. With respect to SoC components, for example, discovery information may include, but is not limited to: a total number of processing cores, core hardware versions, core firmware versions, SoC firmware versions, drivers versions, and capabilities supported by each.

Still referring to FIG. 3, in some implementations, responsive actions 306 may be performed by application 210A based upon its internal logic. For example, in response to determining that GNA SoC participant 207A is available in operation 307, in operation 308 application 210A may send a request or command to GNA SoC participant 207A to run a background noise reduction model or the like, via API 205 and/or via a direct API set into GNA SoC 206A.

In operation 309, GNA SoC participant 207A may update its capability and/or status information with GNA provider 209A, via API 205. Still in operation 309, GNA SoC participant 207A may add the request from application 210A to a processing queue for GNA SoC 206A. Then in operation 310, GNA provider 209A may update the capability and/or status information with discovery service 215A. In some cases, discovery service 215A may multicast the updated capability and/or status information to all applications 210A-N registered with platform framework 200 to use GNA SoC participant 207A.

Additionally, or alternatively, in operation 311, in response to determining that GNA SoC participant 207A is not available (or not sufficiently available based on one or more availability/processing threshold values, power consumption, performance rates, etc.), application 210A may wait (a timeout) and retry the request in operation 312. Additionally, or alternatively, in operation 313, in response to determining that GNA SoC participant 207A is not available (or not sufficiently available based on one or more availability/processing threshold values, power consumption, performance rates, etc.), application 210A may run the noise reduction model on an alternative hardware component, here represented by GPU SoC participant 207B in platform framework 200.

In other implementations, however, responsive actions 306 may be initiated by discovery service 215A to orchestrate or manage resources registered with platform framework 200, for example, based upon a discovery/availability policy, as well as any combination of context information. For example, in some cases, responsive actions 306 outlined in a policy may be selected based upon: IHS postures, IHS location, IHS power states, application in execution, application in foreground or background, user presence or proximity, etc. Moreover, the policy may also identify selected capabilities and enforce allocation of resources with respect to those capabilities (e.g., in a GNA, 10% of a core may be allocated to processing speech-to-text algorithms/models and 25% may be allocated to noise reduction algorithms/models).

In other cases, the capabilities provided by GNA provider 209A may be increased or decreased, and/or reported or not reported, by discovery service 215A based upon context information. For instance, if GNA SoC 207A is currently available but context information shows that the battery power level of the IHS has crossed a low threshold value, or if calendar event data shows that the user is about to start a new high-priority application—e.g., video conferencing—that is expected to use all of GNA SoC's resources, service 215A may respond to application 210A's discovery request by stating that GNA provider 209A is unavailable and/or available at a reduced capacity than the underlying resource actually has.

In some implementations, a provider availability or service object (e.g., 209A) may be registered with platform framework 200 via API 205 using a specification (e.g., in JavaScript Object Notation or "JSON") such as:

```
{
    "comments": "API spec for provider availability",
    "auth_token": "rt12342d",
    "container_id": "abcd",
    "platform_id": "p5435",
    "conditions": [{
        "type": "Available",
        "handle to policy": "void *ptr",
        "AvailBool": "True",
        "registered object auth tokens": ["t1", "t2",....]
    }, {
        "type": "Queue",
        "handle to policy": "void *ptr",
        "Queue_cnt": "3",
        "registered object auth tokens": ["t3", "t4",....] }, {
        ...
    }]
}
```

Figure 4:
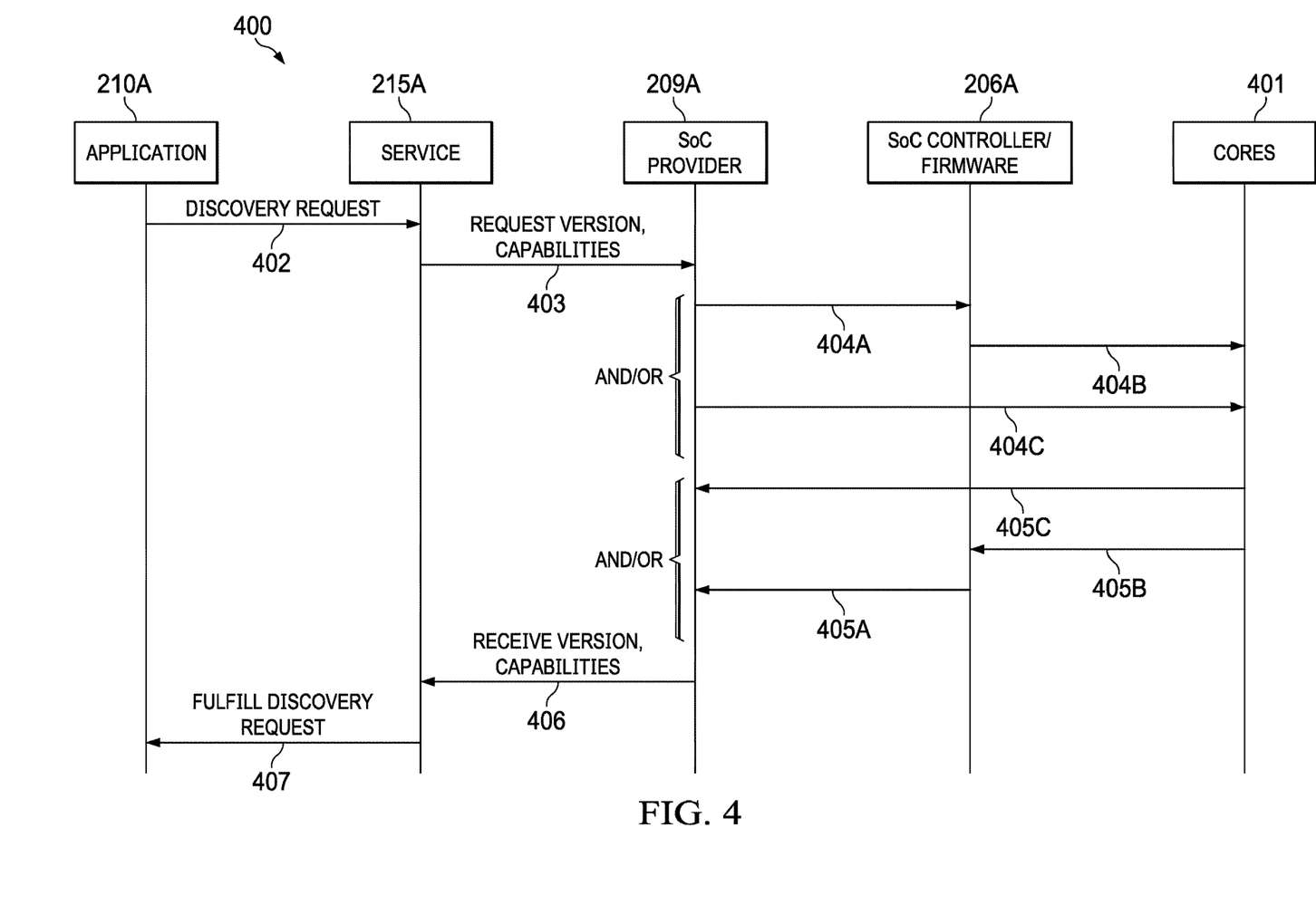
FIG. 4 is a message diagram illustrating an example of a method for platform framework discovery, according to some embodiments.

FIG. 4 is a message diagram illustrating an example of method 400 for platform framework discovery, according to some embodiments. In operation 402, application 210A sends a discovery request to discovery service 215A via API 205. Discovery service 215A may be a software service that aggregates SoC cores, FW/SW versions across cores, offload cores available, memory capabilities, and cross-core platform frameworks, and surfaces up to registered applications for discovery.

In operation 403, in response to 402, discovery service 215A sends a request for discovery information (e.g., current status, versioning, capabilities, availability, etc.) to registered SoC provider 209A. In response to operation 403, SoC provider 209A sends: in operation 404A, a request for discovery information to SoC controller/firmware 206A, which is configured to make its own request 404B of each individual SoC core 401 coupled thereto; and/or in operation 404C, the request for discovery information is sent directly to any selected individual SoC core 401.

In operations 405A-C, in response to operations 404A-C, SoC controller/firmware 206A and/or cores 401 provide the requested discovery information or a portion thereof to SoC provider 209A. In operation 406, discovery service 215A receives the discovery information from SoC provider 209A. Then, in operation 407, discovery service 215A fulfills the discovery request, at least in part, by conveying at least a portion of the discovery information to application 210A.

In some cases, method 400 may be executed while IHS 100 is in modern standby. Method 400 may also enable an application to offload processing to cores outside a main processor(s) 101 using discovery mechanisms though connectivity interfaces (e.g., SPI/I²C) abstracted out as services on those cores. In addition, method 400 may further enable versioning of objects with reference to a centralized object that is aligned with a main deliverable (e.g., thermal participants included in a BIOS revision, etc.).

In some implementations, a participant (e.g., 207A-N, 210A-N, etc.) may provide discovery information to platform framework 200 as a discovery object via API 205 using a specification (e.g., in JSON) such as:

```
{
    "comments": "API spec for discovery and capabilities",
    "auth_token": "rt12342d",
    "container_id": "abcd",
    "platform_id": "p5435",
    "component": [{
        "comments": "component descriptions follow",
        "soc or driver": "<descriptor>",
        "soc version" : "xx.yy.zz",
        "fw version": "xx yy zz",
        "capabilities": "void * handle",
    }, {
        ...
    }]
}
```

In some embodiments, systems and methods described herein may be used to manage compute resources in a platform framework. For example, the maximum number of concurrent, non-interruptive noise cancellation models running on processor(s) 101 may be limited to the processor(s) 101's compute load. In these cases, systems and methods described herein may use multiple offload cores (e.g., of a GNA, VPU, etc.) to process certain workloads as defined by a policy. Additionally, or alternatively, systems and methods described herein may enable managing such a policy based on context (e.g., IHS location, IHS posture, user proximity, etc.).

Moreover, for collaborative tasks (e.g., video encode and decode, and/or other pre- and post-processing tasks such as virtual background, framing, etc.), systems and methods described herein enable tying certain workloads (or types of workloads) to specific cores, as defined by the policy. In some cases, workloads may be assigned to offloading cores based upon a number of workloads or models being executed concurrently, the types of workloads or models, a priority of each workload or model, and/or other context information.

For example, a given policy may prescribe the use of processor(s) 101 for up to two concurrent workloads or models, and the use of a GNA core when more than two workloads or models are concurrently executed. Assignment of each workload or model to a given core may be based upon a priority of the workload or model and the processing speed or power of the core (e.g., highest priority workloads are executed by processor(s) 101, medium priority workloads are executed by GPU 107, and lower priority workloads are executed by hardware accelerator 125). Additionally, or alternatively, assignment of each workload or model to a first core or to a second core may differ by policy depending upon a user's proximity or presence, an IHS location, and IHS posture, or any other context information.

Figure 5:
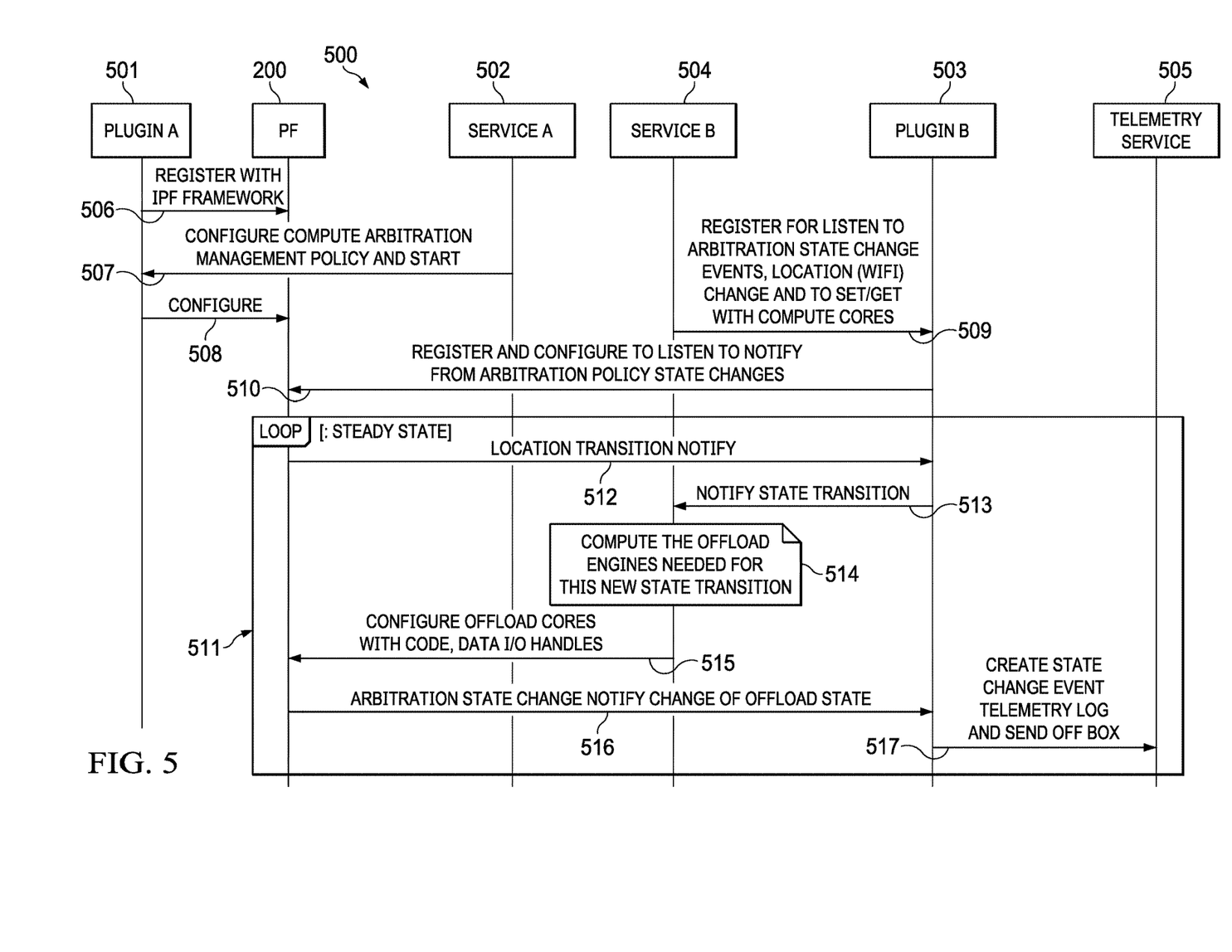
FIG. 5 is a diagram illustrating an example of a method for managing compute resources in a platform framework, according to some embodiments.

FIG. 5 is a diagram illustrating an example of method 500 for managing compute resources in a platform framework, according to some embodiments. As shown, at 506, plugin A 301 (e.g., an instance of PF interface 213) for service A 502 (e.g., an instance of PF-unaware application 212) registers with platform framework 200 as an arbitration object using a service (e.g., 215A-N) within management and oversight engine 202 via API 205. At 507, service A 502 sends plugin A 501 a message to configure an arbitration policy with an arbitration service (e.g., 215A-N) of management and oversight engine 202, and at 508, plugin A 501 configures platform framework 200 to receive selected runtime objects relevant to the policy and to execute the policy. Alternatively, service A 502 may execute the policy.

At 509, service B 504 (e.g., another instance of PF-unaware application 212) sends a command to plugin B 503

(e.g., another instance of PF interface 213) to register with platform framework 200. At 510, plugin B 503 invokes services (e.g., 215A-N) within management and oversight engine 202 of platform framework 200 via API 205 to register and configure it to be notified in response to arbitration policy results and/or state changes (e.g., due to a location change, number of workloads increase or decrease, etc.). In some cases, the registration command may specify a state or context variable name, an arbitration policy (among a plurality of policies), and/or an arbitration object (e.g., service A 502).

In loop 511 (steady state operation), at 512, platform framework 200 notifies plugin B 503 that the physical location of IHS 100 is transitioning and/or has changed (e.g., as determined by GPS coordinates, access point signal strength, etc.). At 513, plugin B 303 notifies service B 504 of the location transition or change. For example, the change of location may involve or require the execution of additional workloads or models above the maximum number of workloads or models (e.g., 2) that trigger an arbitration state change event under the arbitration policy.

At 514, service B 504 computes the offload cores or engines needed for each workload in the new state (e.g., indoors vs. outdoors, as characterized by ALS readings, etc.). Then, at 515, service B 504 sends a set command to platform framework 200 for configuring offload cores with workload code, data I/O handles, etc., for example, by way of a service (e.g., 215A-N) within management and oversight engine 202.

At 516, platform framework 200 executes the policy as configured in 308 and notifies plugin B 503 of an arbitration state change, for example, when maximum number of concurrent workloads on processor(s) 101 is reached, when the priority of one or more workloads changes, and/or when there is a change in context (e.g., IHS location, user presence or proximity, IHS posture, etc.). At 517, in response to 516, plugin B 503 sends telemetry engine 505 (e.g., a service 215A-N within management and oversight engine 202) a message to create a state change event in telemetry database 203 and/or to send the event to another IHS.

In some embodiments, service A 502 and service B 504 may be the same application (e.g., applications 210A-N or 213). Additionally, or alternatively, service A 502 and service B 504 may be OS services.

As such, method 500 enables the contextual management of workloads across multiple compute cores (e.g., CPU, offload cores, GPU etc.) based upon an arbitration compute policy as well as user, environment, system, and other context. Moreover, method 500 may be executed while IHS 100 is in modern standby. Although method 500 illustrates a compute arbitration example, in other embodiments other types of resources may be arbitrated (e.g., in a shared USB bus, which device takes priority, etc.).

In some implementations, a compute arbitration management object (with compute arbitration management, input and output handle for data, conditions to manage in default core and to offload to other cores, etc.) may register onto platform framework 200 via API 205 using a specification (e.g., in JSON) such as:

```
{
"comments": "API spec for compute arbitration management object",
"auth_token": "rt12342d",
"container_id": "abcd",
"platform_id": "p5435",
"conditions": [{
```

-continued

```
"comments": "main core to execute this functionality",
"priority": "1",
"handle to fallover to other cores policy": "void *ptr", "core": "CPU",
"registered object auth tokens": ["t1", "t2",....],
"data input handle": "void *ptr",
"data output handle": "void * ptr",
"code handle": "void *ptr",
"ipf modules involved": "void handle",
},{
"comments": "secondary core to execute this functionality based on failover
(compute mgmt.) policy",
"priority": "2",
"handle to fallover to other cores policy": "void *ptr",
"core": "GNA_SOC",
"registered object auth tokens": ["t1", "t2",....],
"data input handle": "void *ptr",
"data output handle": "void * ptr",
"code handle": "void *ptr",
"ipf modules involved": "void handle",
}, {
...
}]
}
```

In other embodiments, systems and methods described herein may be used to manage runtime object load status in a platform framework. For example, in some cases, an application may have arbitration policy that is loaded during system boot. If there is a runtime modification of the policy during a user's session, the application may need to be reset. To address these, and other issues, systems and methods described herein provide disabling, ignoring, filtering, or de-registering commands that allow an arbitration object to manage the loading of runtime objects and thereby perform system policy updates.

In other cases, an application may determine that a user is in a high-security location and, in response, it may be programmed to disable all user presence or proximity sensors. Using systems and methods described herein, the application may deactivate all user presence or proximity detection sensors via platform framework 200 without having to know which sensors are available and how to communicate with each one individually.

In yet other cases, an IHS may have multiple presence or proximity detection sensors and a user would like to have only a subset of those sensors utilized in user presence detection, but a user presence detection application or service would by default take into account the presence/absence states reported by all available sensors. Using systems and methods described herein, however, the user may restrict input of a participant input into platform framework 200 to ensure that only the desired sensor(s) are utilized.

Figure 6:
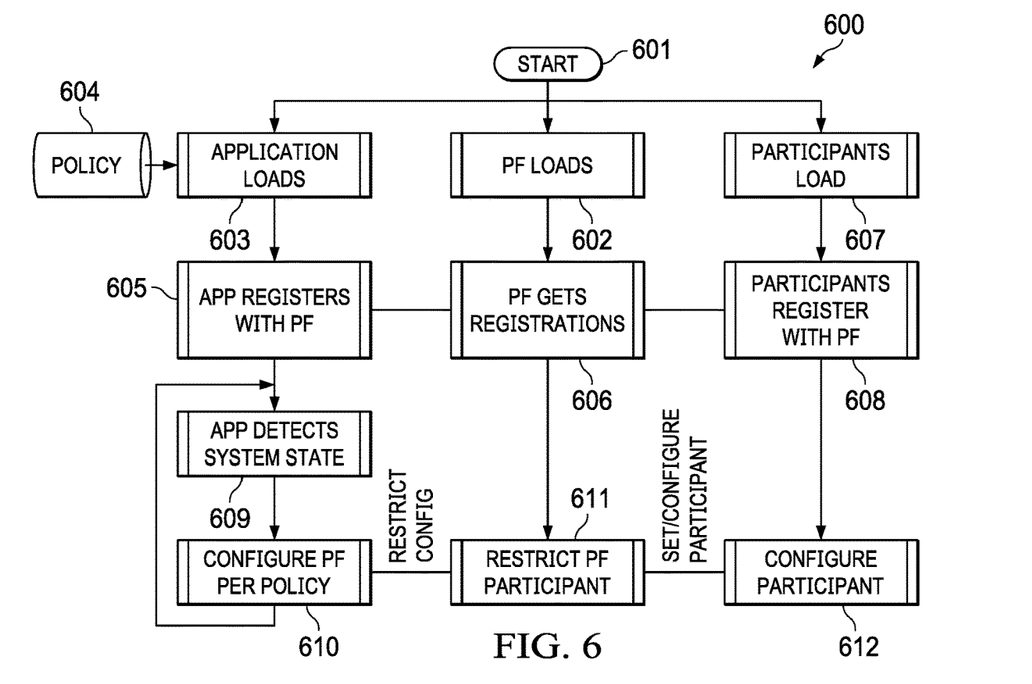
FIGS. 6 and 7 are diagrams illustrating examples of methods for managing runtime object load status in a platform framework, according to some embodiments.
Figure 7:
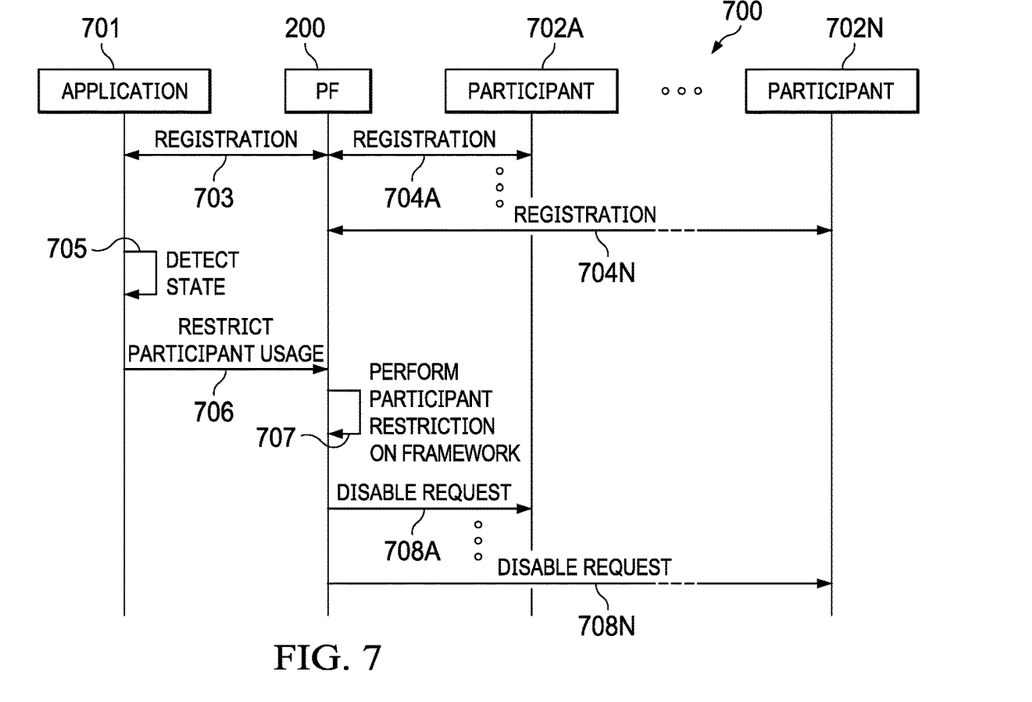

FIGS. 6 and 7 are diagrams illustrating examples of methods 600 and 700 for managing runtime object load status in platform framework 200, according to some embodiments. Particularly, method 600 of FIG. 6 starts at block 601. At block 602, platform framework 200 loads (e.g., by an OS). At block 603, an application (e.g., 210A-N) loads as configured by policy 604. And at block 607 a participant (e.g., 207A-N) loads.

At block 605, the application registers with platform framework 200. At block 608, the participant registers with platform framework 200. Platform framework 200 receives these registrations at block 606.

At block 609, the application detects a system state change, and at block 610 the application configures an arbitration service within platform framework 200 according to policy 604. In addition, at block 611 the application may send a configuration restriction command to platform framework 200, which may in response restrict a targeted participant (or type of participant) from being available, enabled, or loaded onto platform framework 200.

In some cases, the restriction may be temporary and/or automatically lifted when triggered by a specific context (e.g., IHS location, user proximity, IHS posture, etc.). Still at block 611, platform framework 200 may send set or configure commands to a participant to implement the restriction at block 612.

In method 700 of FIG. 7, application 701 (e.g., 210A) registers into platform framework 200 at 703, and participants 702A-N (e.g., 207A-N) register into platform framework 200 at 704A-N. At 705, application 701 detects a state change based upon a policy and/or a change in context information. As a result, at 706, application 701 instructs platform framework 200 to restrict participant usage.

At 707, platform framework 200 performs one or more participant restrictions on the framework, for example, by erasing or blocking (e.g., encrypting) a participant registration record either temporarily and/or until a set of one or more contextual conditions is met (e.g., e.g., IHS location, user proximity, IHS posture, etc.). At 708A-N, platform framework 200 sends disable requests to each of participants 702A-N.

In one implementation, IHS 100 may have 4 user presence detection devices coupled to it. In that scenario, an application determines that it wants to utilize only 2 of the sensors. Using methods 600/700, the application may communicate to platform framework 200 to restrict usage of the 2 input services (runtime objects) not desired. This allows for the application to reduce the possible number of inputs to optimize policy execution.

In another implementation, an application connected to platform framework 200 determines that IHS 100 is in an unsafe or high-risk location (e.g., a coffee shop, etc.). The application communicates with platform framework 200 to restrict communication of all biometric user presence devices. As such, the platform framework 200 may restrict any biometric user presence devices from communicating onto the framework and attempt to perform security operations.

In yet another implementation, an application connected to platform framework 200 determines that IHS 100 user is in an unsafe or high-risk location (e.g., a coffee shop, etc.). The application would like to ensure that no telemetry operations occur. Accordingly, the application may send a communication to platform framework 200 and restrict all telemetry applications and data sets from being registered and/or from publishing data onto the framework.

In some implementations, a runtime object load configuration object or policy may register onto platform framework 200 via API 205 using a specification (e.g., in JSON) such as:

```
{
  "comments": "API spec for object load configuration",
  "auth_token": "rt12342d",
  "container_id": "abcd",
  "platform_id": "p5435",
  "conditions": [{
    "type": "Object Load",
    "handle to policy": "void *ptr",
    "registered object auth tokens": ["t1", "t2",....]
  },{
    "type": "camera",
```

-continued

```
    "handle to policy": "void *ptr",
    "loadType": "restrict",
    "loadScope": "all",
    "registered object auth tokens": ["t3", "t4",....] },
  }, {
    ...
  }]
}
```

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution, cause the IHS to:
receive, at a platform framework via an Application Programming Interface (API), an arbitration policy;
notify an application, by the platform framework via the API, of a state change with respect to the arbitration policy based upon a change in context;
receive, at the platform framework from the application via the API, an identification of at least one compute resource to execute a workload associated with the arbitration policy; and
offload the workload to the compute resource.

2. The IHS of claim 1, wherein the application is registered with the platform framework to be notified of the state change.

3. The IHS of claim 1, wherein the state change comprises a change in location of the IHS.

4. The IHS of claim 1, wherein the state change comprises a change in user proximity to the IHS.

5. The IHS of claim 1, wherein the state change comprises a change in IHS posture.

6. The IHS of claim 1, wherein the state change comprises a change in power state of the IHS.

7. The IHS of claim 1, wherein the state change comprises a change in battery charge level of the IHS.

8. The IHS of claim 1, wherein the application is configured to identify the compute resource based, at least in part, upon a priority of the workload.

9. The IHS of claim 1, wherein the platform framework comprises an arbitration service configured to execute the arbitration policy based upon a processing of a plurality of runtime objects representing the context.

10. The IHS of claim 9, wherein the plurality of runtime objects comprises at least one of: operating temperature objects, battery metrics objects, IHS performance objects, IHS posture objects, audio capture objects, video capture objects, IHS location objects, or user proximity objects.

11. The IHS of claim 9, wherein the program instructions, upon execution, further cause the IHS to disable a participant of the platform framework in response to the state change, and wherein the participant produces at least one of the runtime objects.

12. The IHS of claim 1, wherein the compute resource comprises a hardware accelerator core.

13. A memory storage device having program instructions stored thereon that, upon execution by an Information Handling System (IHS), cause the IHS to:
receive a notification, at an application from a platform framework via an Application Programming Interface (API), of a state change with respect to an arbitration policy based upon a change in context; and
in response to the notification, provide, by the application to the platform framework via the API, an identification of at least one compute resource to execute a workload.

14. The memory storage device of claim 13, wherein the application is registered with the platform framework to be notified of the state change.

15. The memory storage device of claim 13, wherein the state change comprises a change in at least one of: a location of the IHS, user proximity to the IHS, IHS posture, a power state of the IHS, or a battery charge level of the IHS.

16. The memory storage device of claim 13, wherein the platform framework comprises an arbitration service configured to execute the arbitration policy based upon a processing of a plurality of runtime objects representing the context, wherein the program instructions, upon execution, further cause the IHS to disable a participant of the platform framework in response to the state change, and wherein the participant produces at least one of the runtime objects.

17. A method, comprising:
receiving a notification, at an application from a platform framework via an Application Programming Interface (API), of a state change with respect to an arbitration policy based upon a change in context; and
in response to the notification, providing, by the application to the platform framework via the API, a request to enable or disable a participant of the platform framework, wherein the participant produces at least one runtime object representing the context.

18. The method of claim 17, further comprising, in response to the notification, providing, by the application to the platform framework via the API, an identification of at least one compute resource to execute a workload.

19. The method of claim 17, wherein the application is registered with the platform framework to be notified of the state change.

20. The method of claim 17, wherein the state change comprises a change in at least one of: a location of the IHS, user proximity to the IHS, IHS posture, a power state of the IHS, or a battery charge level of the IHS.

* * * * *